United States Patent
Sazonova

(10) Patent No.: US 12,321,710 B2
(45) Date of Patent: Jun. 3, 2025

(54) MACHINE LEARNING-BASED TRANSLATION OF ADDRESS STRINGS TO STANDARDIZED ADDRESSES

(71) Applicant: SafeGraph, Inc., San Francisco, CA (US)

(72) Inventor: Vera Sazonova, Montréal (CA)

(73) Assignee: SafeGraph, Inc., San Francisco, CA (US)

( * ) Notice: Subject to any disclaimer, the term of this patent is extended or adjusted under 35 U.S.C. 154(b) by 662 days.

(21) Appl. No.: 17/531,541

(22) Filed: Nov. 19, 2021

(65) Prior Publication Data

US 2023/0161976 A1    May 25, 2023

(51) Int. Cl.
   *G06F 40/58*    (2020.01)
   *G06N 5/025*    (2023.01)

(52) U.S. Cl.
   CPC ............. *G06F 40/58* (2020.01); *G06N 5/025* (2013.01)

(58) Field of Classification Search
   CPC .................................. G06F 40/58; G06N 5/025
   See application file for complete search history.

(56) References Cited

U.S. PATENT DOCUMENTS

| | | | | |
|---|---|---|---|---|
| 2016/0140182 A1* | 5/2016 | Hess | .................. | G06F 16/3334 707/771 |
| 2020/0058042 A1* | 2/2020 | Kulkarni | ................ | G06N 20/00 |
| 2021/0012199 A1* | 1/2021 | Zhang | ..................... | G06N 7/01 |
| 2021/0192267 A1* | 6/2021 | Gartner | ................. | G06N 3/086 |

OTHER PUBLICATIONS

USPS, CASS Certification, retrieved on Mar. 22, 2022, 6 pages. Retrieved from the internet [URL: postalpro.usps.com/certifications/cass ].

Canada Post, Addressing Guidelines, retrieved on Mar. 22, 2022, 5 pages. Retrieved from the internet [URL: www.canadapost-postescanada.ca/cpc/en/support/articles/addressing-guidelines/canadian-addresses.page??? <http://www.canadapost-postescanada.ca/cpc/en/support/articles/addressing-guidelines/canadian-addresses.page???> ].

SpaCY, Homepage, retrieved on Mar. 22, 2022, 12 pages. Retrieved from the internet [URL: spacy.io/ ].

Hugging Face, bert-base-NER—Named Entity Recogntiion Example, retrieved on Mar. 22, 2022, 6 pages. Retrieved from the internet [URL: huggingface.co/dslim/bert-base-NER ].

(Continued)

*Primary Examiner* — Bhavesh M Mehta
*Assistant Examiner* — Edward Tracy, Jr.
(74) *Attorney, Agent, or Firm* — Flagship Patents; Sikander M. Khan; Shivshanker S. Naimpally

(57) ABSTRACT

The technology disclosed relates to systems and methods for constructing standardized addresses for a plurality of jurisdictions. The system comprises a trained model configured to process, an input, a string that includes a sequence of substrings. The trained model is configured to produce, as output, respective address component classifications for respective substrings in the sequence of substrings. The trained model is trained on thousands to millions of training examples that map substrings to a plurality of address component types and a plurality of non-address component types.

24 Claims, 11 Drawing Sheets

(56) References Cited

OTHER PUBLICATIONS

The Stanford Natural Language Processing Group, Stanford Named Entity Recognizer (NER), Stanford University, retrieved on Mar. 22, 2022, 9 pages. Retrieved from the internet [URL: nlp.stanford.edu/software/CRF-NER.html ].

Sang et al., Introduction to the CoNLL—2003 Shared Task: Language-Independent Named Entity Recognition, In Proceedings of the Seventh Conference on Natural Language Learning at HLT-NAACL, dated 2003, 6 pages.

SpaCy, Library Architecture, retrieved on Mar. 22, 2022, 6 pages. Retrieved from the internet [URL: spacy.io/api#nn-model ].

USAddress, usaddress 0.5.4 Documentation, retrieved on Mar. 22, 2022, 4 pages. Retrieved from the internet [URL: usaddress.readthedocs.io/en/latest/ ].

Smarty Streets, Homepage, retrieved on Mar. 22, 2022, 8 pages. Retrieved from the internet [URL: SmartyStreets.com ].

Ordnance Survey, Homepage, retrieved on Mar. 22, 2022, 5 pages. Retrieved from the internet [URL: http://www.ordnancesurvey.co.uk/ ].

OpenStreetMap, About page, retrieved on Mar. 22, 2022, 1 page. Retrieved from the internet [URL: https://www.openstreetmap.org/about ].

\* cited by examiner

Example: Normalize Values of Address Components

6305 6th Av n unit 20 — 201

"parsed": {
 "PRIMARY_NUMBER": "6305", — 221
 "STREET_NAME": "6th", — 223
 "STREET_SUFFIX": "Av", — 225
 "STREET_POSTDIRECTION": "n", — 227
 "UNIT_TYPE": "unit", — 229
 "UNIT_NUMBER": "20" — 231
},

— 211

"normalized_parsed": {
 "PRIMARY_NUMBER": "6305", — 261
 "STREET_NAME": "6th", — 263
 "STREET_SUFFIX": "Avenue", — 265
 "STREET_POSTDIRECTION": "North", — 267
 "UNIT_TYPE": "Unit", — 269
 "UNIT_NUMBER": "20" — 271
},

— 251

| Standardized Building Address | "6305 6th Avenue North" | — 281 |
| Standardized Full Address | "6305 6th Avenue North, Unit 20" | — 291 |

FIG. 2

Example: Remove Organization's Name

400 Horsham Rd Horsham Athletic Club — 301

"parsed": {
  "PRIMARY_NUMBER": "400",
  "STREET_NAME": "Horsham",
  "STREET_SUFFIX": "Rd",  — 321
  "NOT_ADDRESS": "Horsham Athletic Club"  — 323
}, "normalized_parsed": {
  "PRIMARY_NUMBER": "400",
  "STREET_NAME": "Horsham",
  "STREET_SUFFIX": "Road",
  "NOT_ADDRESS": "Horsham Athletic Club"  — 361
}, Standardized Building Address : "400 Horsham Road",  — 381
Standardized Full Address : "400 Horsham Road"  — 391

311 (brace for parsed section)
351 (brace for normalized section)

*Removes organization name*

FIG. 3

Example: Detect and Translate Intersection Address

6th Ave & 13th Street — 401

"parsed": {
"STREET_NAME": "6th", — 421
"STREET_SUFFIX": "Ave", — 423
"INTERSECTION": "&", — 425
"STREET_NAME2": "13th", — 427
"STREET_SUFFIX2": "Street" — 429
}, — 411

"normalized_parsed": {
"STREET_NAME": "6th",
"STREET_SUFFIX": "Avenue", — 461
"INTERSECTION": "And", — 463
"STREET_NAME2": "13th",
"STREET_SUFFIX2": "Street"
}, — 451

Standardized Address : "Corner of 6th Avenue And 13th Street", — 481
Standardized Full Address : "Corner of 6th Avenue And 13th Street" — 491

*Correctly detects and templates intersection*

FIG. 4

Example: Remove Unnecessary Building Name

133 Terra Mango St Large Building Ste 100 — 601

"parsed": {
 "PRIMARY_NUMBER": "133",
 "STREET_NAME": "Terra Mango",
 "STREET_SUFFIX": "St",
 "BUILDING_NAME": "Large Building", — 627
 "UNIT_TYPE": "Ste",
 "UNIT_NUMBER": "100"
}, — 611

"normalized_parsed": {
 "PRIMARY_NUMBER": "133",
 "STREET_NAME": "Terra Mango",
 "STREET_SUFFIX": "Street", — 665
 "BUILDING_NAME": "Large Building", — 667
 "UNIT_TYPE": "Suite",
 "UNIT_NUMBER": "100" — 669
}, — 651

Standardized Building Address : "133 Terra Mango Street", — 681
Standardized Full Address : "133 Terra Mango Street, Large Building, Suite 100" — 691

*Removes unnecessary building name*

FIG. 6

Composite street types

*Convention*

- Park Dr: 7025 Eastman Park Dr
- Pwy Ave: 520 N Pinal Parkway Ave
- Hl Rd: 2808 Gardner Hill Rd
- St Ct: 1501 48th street ct e
- Ave Ct: 120 Bahia Avenue Court

915

*Badly recognized intersections:*

- Ave St: 4801 Church Ave E 48th St
- St St: 601 south east d street sixth street

MACHINE LEARNING-BASED TRANSLATION OF ADDRESS STRINGS TO STANDARDIZED ADDRESSES

FIELD OF THE TECHNOLOGY DISCLOSED

The technology disclosed relates to translating text strings comprising address substrings and non-address substrings describing location of a place-of-interest to a standardized address.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A place-of-interest (POI), or a place, or a location can be referred to across various data sets by address strings provided by respective data providers. The addresses of a same POI can be stored differently in different databases, thus causing problems for address processing systems and end users who want to locate the POI. Often these addresses of a POI are inconsistent, not properly formatted and may have missing or duplicate substrings for one or more parts or components of the address. Such inconsistencies can result in incorrect addresses which can cause inconvenience to users and loss of revenue to businesses. Addresses in a standardized format can also support automation. Achieving standardization, however, is non-trivial as multiple sources or databases of address strings may provide a variety of different address strings for a same POI.

An opportunity arises to automatically generate a standardized address from inconsistent and poorly formatted address strings in natural language. The standardized address can comply with address formatting rules of a jurisdiction in which the POI is located and therefore, help businesses and end users to correctly locate the POI.

BRIEF DESCRIPTION OF THE DRAWINGS

FIG. 2 presents an example of normalizing substrings in an address string and one-to-one mapping of address substrings to respective address components.

FIG. 3 presents an example of removing an organization's name in the address string by classifying the substring representing organization's name as a non-address substring.

FIG. 4 presents an example of detecting an intersection address in the address string and mapping the address substrings in the address string to components of an intersection address.

FIG. 6 presents an example of detecting an unnecessary or redundant building name in the address string and removing the building name.

FIG. 9 presents examples of compound or composite street type suffixes.

DETAILED DESCRIPTION

Figure 1:
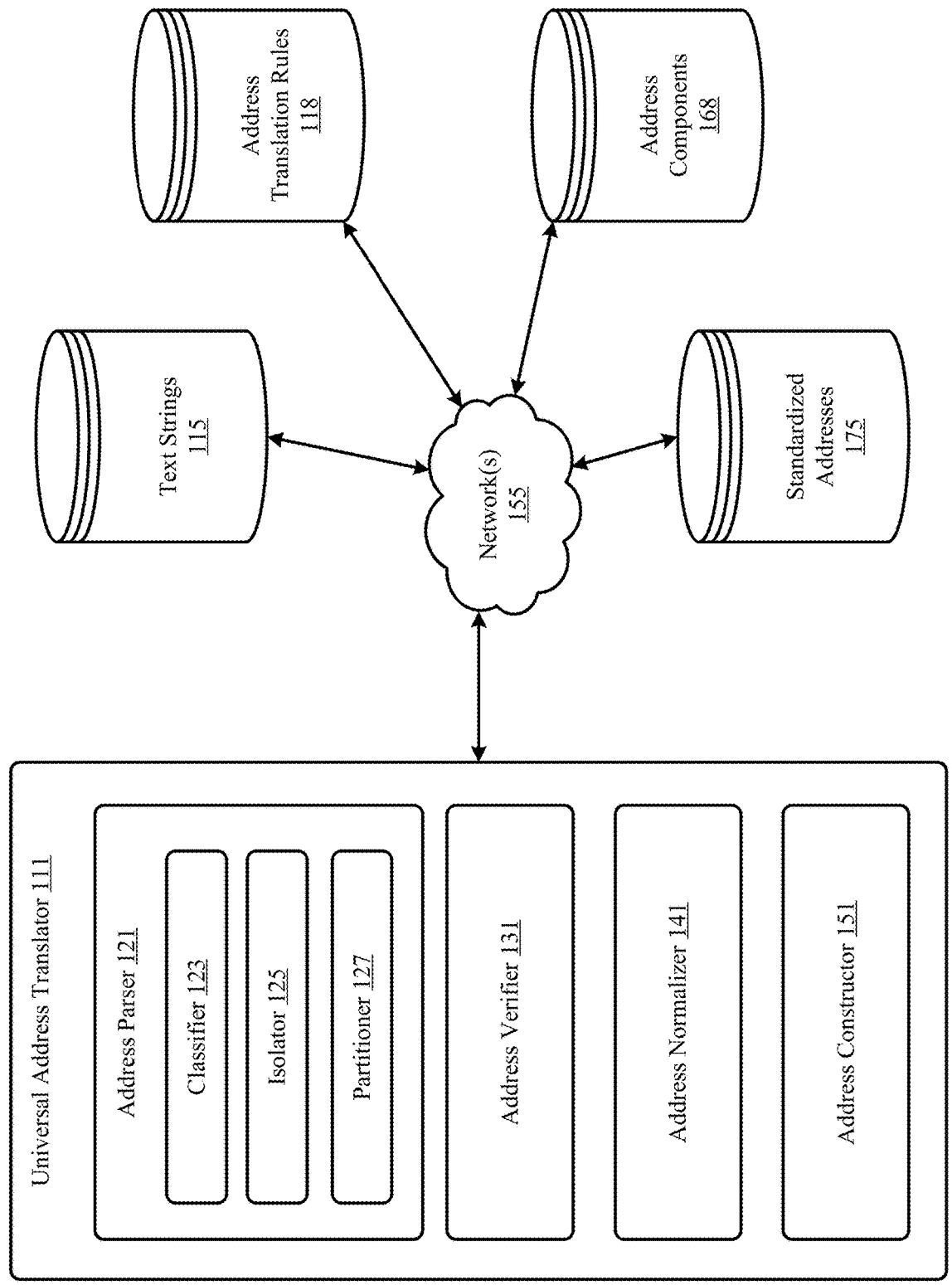
FIG. 1 illustrates a block diagram of an example environment for translating an address string comprising a plurality of substrings to a standardized address.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

INTRODUCTION

A physical place is usually identified by an identifier such as a name, an address, or a combination of name and address. The addresses can be maintained by separate organizations or sources for their own use or for distribution to third-parties for locating places-of-interest. The address can comprise multiple address components such as a primary number, a street name, a street suffix, a street postdirection, a unit type, a unit number, a city name, a state or province name, a country name, a postal code, etc. The number of address components, their arrangement or order in the standardized address can vary across jurisdictions (such as countries, territories, etc.). For example, in some countries, a primary number may be positioned at the end of the text string describing the standardized address while in other countries, the primary number can be positioned at the beginning of the standardized address.

For each jurisdiction, a standardized address format is usually defined by a regulatory body or a government department. For example, in the United States, CASS™ address standardization is the process of standardizing addresses so that they follow the USPS® Coding Accuracy Support System (CASS™) requirements available at <<postalpro.usps.com/certifications/cass>>. A CASS™ certified address validation system can verify that a given address in United States is valid and complete. The postal service of a jurisdiction can automatically process letters and packages that have standardized destination addresses. For example, Canada Post provides recommended addressing guidelines for various categories of addresses in Canada including Civic addresses, Civic addresses in a rural area, Postal box addresses, Military addresses, etc. The addressing guidelines from Canada Post are available at <<www.canadapost-postescanada.ca/cpc/en/support/articles/addressing-guidelines/canadian-addresses.page???>>.

Existing address verification and/or address translation systems require that the input address string is well formed. For example, these systems may require the address string to contain at least a minimum number of address components to perform the verification or translation process. Such systems may not perform the verification or translation of a poorly formatted address string if it is not in a required format, or if the address string does not contain all of the address substrings that map required address components. Other issues in address strings can include presence of duplicate substrings or presence of substrings that do not map to any address component in the standardized address format for a given jurisdiction. The issues described above can make an address string as non-compliant and thus may not correctly describe location of a POI. Additionally, existing address verification systems may not process or accept address strings that describe location of a place-of-interest in terms of other references such as an intersection.

Multiple non-compliant address strings describing the location of a same POI should produce the same standardized address when provided to an address verification and translation system. However, existing systems often do not provide consistent output when provided as input, multiple different non-compliant address strings describing address of a same POI. The technology disclosed resolves this problem. For example, when provided three different non-compliant address strings ("I-87", "IH 87", and "Interstate 87") describing a same interstate highway, the system provides a consistent output i.e., "Interstate Highway 87".

The technology disclosed can classify substrings in the address string as address substrings and non-address substrings. The classification can be performed by a trained machine learning model that is trained using ground truth address strings for a given jurisdiction. For example, consider an address string, "400 Horsham Rd Horsham Athletic Club". The machine learning model can classify the substring "Horsham Athletic Club" in the address string as a non-address substring.

The technology disclosed can also classify an address substring as redundant and not include that substring when constructing a standardized address. Suppose a building name is included in the address string describing the address of the location. For example, the address string "133 Terra Mango St Large Building Ste 100", includes a building name. In this example, the address sub string "Large Building" is the name of the building at the POI. The system can translate this address string into an address "133 Terra Mango Street" by removing the building name address substring which is unnecessary in the output standardized address.

The technology disclosed can process address substrings that are mapped to primary number address component (or street number) in ordinal, cardinal or spelled out formats. The system consistently translates such different formats in input strings to the same format in the standardized address.

The technology disclosed can also detect and correct a plurality of pre-defined non-compliant signatures in the address strings describing location of a POI. A pre-defined non-compliant signature can represent a frequently occurring pattern of substrings in the address strings that do not conform to an order or arrangement of address components for a standardized address for a jurisdiction. We present various examples of non-compliant signatures.

A first example of a pre-defined non-compliant signature can be presence of two or more street addresses (primary number and street name) in the address string such as "6$^{th}$ Ave & 13$^{th}$ Street". The two street addresses can be separated by a symbol such as "&" etc. in the address string. The technology disclosed can translate such non-compliant input address string into a standardized address by appropriately processing the input address string. In one instance, the technology disclosed can translate this input address string into an intersection address such as "Corner of 6$^{th}$ Avenue And 13$^{th}$ Street". Additionally, the technology disclosed outputs the standardized address in a deterministic format irrespective of the sequence of multiple streets in the intersection address in the input address string. This provides a consistent output for different inputs for address of a same location. We explain this further using the example presented in FIG. 4.

A second example of a pre-defined non-compliant signature can include presence of at least one duplicate address substring of the location, e.g., "2650 us highway 92 e, 2650". In this example, the primary number "2650" is duplicate. The system can remove the duplicate primary number at the end of the string and translate the input string to "2650 US Highway 92 East".

A third example of a pre-defined non-compliant signature can include address substrings that map to two or more address components. This can occur more frequently in some jurisdictions. For example, an input string, "Mainzer Landstr. 176" describes address of a POI in Germany. The technology disclosed can further partition the one-to-many mapped address substring into address substrings that correspond to respective address components. In this example, the system detects that in a German address, the street type and street name are joined together. The system then translates the input address string to a format which meets the address format rules of Germany resulting in, "Mainzer Landstraße 176".

The above examples are presented to show some examples of pre-defined non-compliant signatures that can be detected and translated to standardized address by the technology disclosed. The system can be trained to detect and correct other types of non-compliant signatures for a plurality of jurisdictions.

The technology disclosed can train existing natural language processing (NLP) models to process address strings and use the output from such models to classify substrings as address substrings and non-address substrings which are then further processed to apply respective formatting rules that may be jurisdiction specific. An example of a model applied by the technology disclosed includes spaCY package for NLP available at <<spacy.io/>>. This package provides features for tokenization, entity recognition, and many other convenient methods for recognition and normalization of text in address strings. The technology disclosed can train the NLP model for different jurisdictions and apply the respective trained model to process the address strings for that jurisdiction. The spaCY framework is used due to its speed, simplicity, ease of use and low memory requirement.

The technology disclosed can train and apply other types of machine learning models to detect non-conformance of substrings in address string to formats of respective address components or detection of non-address substring in the address string. Examples of other NER (named entity recognition) models that can be applied by the technology disclosed include modern hugging face NER available at <<huggingface.co/dslim/bert-base-NER>>, classic Stanford NER available at <<nlp.stanford.edu/software/CRF-NER-.html>>, etc. The modern hugging face NER is a fine-tuned BERT model that is ready to use for named entity recognition. This model has been trained to recognize four types of entities including location (LOC), organizations (ORG), person (PER), and miscellaneous (MISC). This model is fine-tuned on the English version of the standard CoNLL-2003 Named Entity Recognition dataset, see <<aclanthology.org/W03-0419.pdf>> for further details of the dataset. The training dataset distinguishes between the beginning and continuation of an entity so that if there are back-to-back entities of the same type, the model can output where the second entity begins. The Stanford NER model comes with feature extractors for person, organization, and location. We now present details of the technology disclosed in the following section.

Environment

We describe a system for consistently translating address strings to standardized addresses. The address strings can include substrings that are mapped to respective address components. The system can be configured to process address strings for a plurality of jurisdictions. The system is described with reference to FIG. 1 showing an architectural-level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of system 100. The figure illustrates a universal address translator 111, a text strings database 115, an address translation rules database 118, an address components database 168, a standardized addresses database 168, and a network(s) 155. The network(s) 155 couples the universal address translator 111, the text strings database 115, the address translation rules database 118, the address components database 168, the standardized addresses database 175. The universal address translator 111 can further comprise an address parser 121, an address verifier 131, an address normalizer 141, and an address constructor 151. The address parser 121 can further comprise a classifier 123, an isolator 125 and a partitioner 127.

We now refer to FIG. 1 to provide description of components of the system 100. The universal address translator 111 includes logic to translate an address string to a standardized address. As mentioned above, the standardized address can comprise a plurality of address components. The address components can vary from one jurisdiction to another. For example, in the United States, a standardized address can include a primary number address component, a street name address component, a street suffix address component, a street postdirection address component, a unit type address component, a unit number address component, a city address component, a state address component, a country address component, and a postal code address component. A standardized address in the United States may not include all of the address components listed above depending upon the type of location of the POI.

In one implementation, the standardized address is an address that follows the requirements set forth by the respective jurisdiction. For example, in the United States, an address that follows the United States Postal Service (or USPS) Coding Accuracy Support System (or CASS™) requirements is referred to as a standardized address, available at <<postalpro.usps.com/certifications/cass>>. CASS™ enables the USPS to evaluate the accuracy of an address provided by an address generation system, an address database or an end user. The accuracy or quality of an address verification system is determined based on a validated standardized address (e.g., CASS validated address) output by the system for a POI.

The input address strings can be stored in a text string database 115. The input address strings can include substrings and may contain one or more non-compliant signatures as presented above. Further details of substrings that do not conform to standardized formats of respective address components and non-compliant signatures are presented in FIGS. 2 to 8. The system can also include templates that specify order of concatenating address substrings to translate the address string to a standardized address. The address translation rules and templates can be stored in address translation rules database 118. The address translation rules and templates can be arranged per jurisdiction. Further details of such translation rules and templates are presented with reference to examples of address translation presented in FIGS. 2 to 8. The system can have access to standardized formats for address components for various jurisdictions. The address components and their respective standardized formats can be stored in the address components database 168. The address components can be stored per jurisdiction in the database 168. Examples of address component for a standardized address in United States can include a primary number, a street name, a street suffix, a street postdirection, a unit type, a unit number, a city, a state, a country, and a postal code. The standardized addresses output by the system can be stored in the standardized addresses database 175.

The databases 115, 118, 168, and 175 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus, in FIG. 1, the databases 115, 118, 168, and 175 can be considered to be a single database. In the following section, we present details of the system components of universal address translator 111.

System Components

We now describe details of components of the universal address translator 111. The universal address translator comprises the address parser 121, the address verifier 131, the address normalizer 141, and the address constructor 151 components. Details of the system components are presented below.

Address Parser

The address parser 121 comprises the classifier 123, the isolator 125, and the partitioner 127 subcomponents. The address parser includes logic to parse the address string to classify substrings by detecting entities in the substrings. The address parser can classify the substrings as address substrings and non-address substrings. The isolator 125 then isolates non-address substrings. The partitioner 127 detects address substrings that comprise entities mapping to two or more address components and partitions these address substrings such that there is a one-to-one mapping of address substrings to address components. We present the details of how the subcomponents of the address parser 121 perform these tasks in the following sections.

Classifier

The classifier 123 includes logic to classify address substrings in address strings. The address substrings contain entities and/or sub-entities that describe the location of a place-of-interest (POI) in a natural language. The entities and sub-entities can vary across jurisdictions. For example, a street name, a street suffix, a postal code, etc. can be considered as entities. Entities can vary across jurisdictions. The system can use natural language processing (NLP) models to parse the input string and classify substrings as address substrings and non-address substrings. The address substrings include entities that are required to construct a standardized address for a given jurisdiction. The substrings that do not contain entities required for the standardized address are classified as non-address substrings.

The NLP model (or the entity recognition model) can detect substrings in the input address string that include values corresponding to the entities and classify the substrings as address substrings. The NLP model can also classify the address substrings based on the type of entity detected. Such classification of address substrings is then used to map each address substring to an address component in the standardized address for the jurisdiction. Examples of address components can include a "Primary Number", "Street Name", "Street Suffix", "Street Postdirection", "Unit Type", "Unit Number", "City". "State", "Country", "Postal Code" etc.

Isolator

The isolator 125 includes logic to isolate non-address substrings. The non-address substrings can be mapped to non-address components. The non-address substrings can be stored separately from the address substrings. Examples of non-address substrings can include a name of the POI which is sometimes included in the input address string. The classifier 123 classifies the substring including the name of the POI as a non-address substring. The isolator 125 can assign the non-address substring to a non-address component so that it is isolated and not used when standardized address is constructed using jurisdiction-specific template. The universal address translator 111 can present the non-address substrings as a separate output along with standardized address to inform the system or the end user about the non-address substrings.

Partitioner

When address strings are less granular and contain multiple entities in the same substrings, the partitioner 127 can detect such compound substrings and invoke a two-step parsing process as described below. In some jurisdictions this can occur more often. For example, address strings describing German addresses can sometimes contain street type and street suffix in the same substring. Therefore, when processing such addresses, the system can parse the same substring (or token) in a second parsing step to separate out or partition the street name from the street suffix.

The partitioner 127 includes logic to detect one-to-many mapping of an address substring to two or more address components. The one-to-many mapped address substring can contain two or more entities or portions corresponding to two or more entities. The partitioner 127 can then invoke the classifier 123 to partition address substring to two or more address substrings. The partitioner 127 can include templates when processing address substrings to detect one-to-many mapping. For example, the partitioner 127 can detect using a template that a given address substring is not a street name and neither a street suffix but combines the street name and street suffix information together in the substring. Upon detecting such compound address substring, the partitioner 127 can invoke the classifier 123 to parse the substring for a second time (or second pass) to classify and partition the one-to-many substring in two or more one-to-one substrings. The partitioner can provide the partitioned substrings in the second iteration to further classification.

The partitioner 127 can then assign values of the one-to-one mapped substrings to their respective address components.

When processing addresses in a jurisdiction such as the United States, the system defines all components of the address separately, such as, street name, street type/suffix, street direction, etc. Every granular substring has a label from the statistical model. In some other jurisdictions, the address substring is labeled such that for example, the substring including street information (including street name, street direction, street suffix, etc.) is labeled as one entity. In this case, the statistical NLP model can detect the complete street name as one entity in the first classification step. In the second classification step, the system can classify each sub-entity and partition the substring to further substrings corresponding to each classified sub-entity.

The system can generate consistent outputs when provided compound street suffixes. For example, the address input strings "14001 hull st rd" and "10535 hull street rd" can both have consistent compound street suffix as defined by the template. The system can output the same street name and suffix for both strings which can be ("Hull Street"), ("Rd") as defined by the template. Existing systems can produce multiple street names and suffixes when such input addresses are provided e.g., in this case the output for the first input string can be ("Hull Street"), ("Rd") and the second input string can be ("Hull"), ("St Rd").

The address substrings can include text that is not formatted in standardized formats for the respective address components. An address verifier 131 as described below can resolve these issues.

Address Verifier

The address verifier 131 includes logic to verify the address components using per jurisdiction formats. The address verifier 131 can include logic to access respective standardized formats for the respective address components from a database such as the address components database 168. The address verifier can then apply logic to conform the address substrings to the respective standardized formats of the respective address components to which the address substrings are mapped. The address verifier 131 thus conforms the address substrings to formats that are required by the jurisdiction in a standardized address. For example, a ZIP code in the United States is a five-digit string. The address verifier can apply this rule to check if there are non-digit characters in the ZIP code address component. Similarly, for an address in Canada, the address verifier can check whether the Postal Code is a six-character alphanumeric string with alternating alphabets and digits, starting with an alphabet. Some parts of the address may be enumerated, for example, a street suffix can be a street, road, lane, avenue, drive etc. and there are a finite number of those for a given jurisdiction. The address verifier can include logic to verify that the address components conform to their respective rules per jurisdiction. Some address components may not have any rules such as street names, etc. For such address components the address verifier may not apply any format conformance.

Address Normalizer

The address normalizer 141 includes logic to normalize the address substrings mapped to respective address components to respective standard formats for the address components. The address normalizer 141 includes logic to create a parse structure which can be a dictionary for each "key" such as a street name, street type, locality, city etc. For each key there is a "value" that is found by the NLP model in the address substring. The address normalizer can access dictionaries for different address components. The dictionaries can be stored per jurisdiction in address translation rules database 118. For example, the normalized value for a street suffix "ave" is "avenue". For highways in the United States there is considerable variation in the format of addresses in input address strings. The system includes logic to produce the highway addresses in a consistent address format by taking in different variations of input address strings describing the addresses of United States highways. Such address strings can include address of interstate highways, state highway, etc. We present further details of highway address translation with reference example presented in FIG. 8.

Address Constructor

The address constructor 151 includes logic to construct the standardized address comprising plurality of address substrings by using per jurisdiction address templates. The address constructor can use a template that specifies an order of concatenating the conformed address substrings. The address constructor can concatenate the conformed address substrings according to specified order. The universal address translator can then output conformed address substrings concatenated in the specified order to make the address available for further use by another system or an end user. Address construction is the final step in translation of address string to a standardized address. The templated address can be different for different jurisdictions according to address rules of the jurisdiction. For example, for one country the unit address maybe in the beginning of the standardized address and for another country the unit address maybe in the end of the standardized address. The per-jurisdiction templates can be stored in the address translation rules database 118 or a separate address templates database.

The technology disclosed can also detect different types of addresses for a same jurisdiction. For example, the technology disclosed can detect whether the address string represents a street address or an intersection address. Upon detecting the type of the address, the address constructor applies respective address template to construct the address. For a street address, the standardized address can start with a street number address component followed by other address component in the template. For an intersection address, the address constructor applies the intersection address template to intersection address. The address constructor constructs the standardized address in a canonicalized form of the intersection, e.g., the standardized address of an intersection can be in a form such as "corner of street number A and street number B". The system can take in the input address string in various different forms and produce the intersection address in a consistent form. For example, one input address string can have "street A" before "street B" and another input address can have "street B" before "street A". The address translator includes logic to generate a consistent output, i.e., for both input address string the output standardized address will be the same. Further details of translating an intersection address are presented with reference to FIG. 4.

Completing the description of FIG. 1, the components of the system 100, described above, are all coupled in communication with the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications. In the following section we present multiple examples of input strings and their translation to standardized addresses by the universal address translator 111. We now present examples of address strings and translation of the address strings to standardized format.

Address Translation Examples

FIGS. 2 to 8 present examples of address strings comprising non-conforming substrings and/or including various non-compliant signatures. The examples illustrate address and non-address substrings classified by the system and standardized addresses constructed by concatenating conformed address substrings using per-jurisdiction templates.

Normalize Address Component Values

FIG. 2 illustrates translation of the address string 201 to a standardized address. The technology disclosed can translate the address string 201 to a standardized building address 281 and a standardized full address 291. The standardized full address includes a unit number which is not included in the building address as the building can have multiple units. We now describe the translation process of the input address string to a standardized address by application of logic by components of the universal address translator 111.

The address parser 121 processes the address string 201 and maps address substrings to address components listed in the "parsed" block 211. The subcomponents of address parser component process the address substrings as described below. The classifier 123 classifies substring in the address string. The classified substrings are then one-to-one mapped to address components as shown in the parsed block 211. The address substring "6305" is mapped to "primary number" address component (221). The address substring "6th" is mapped to "street name" address component (223). The substring "Av" is mapped to "street suffix" address component (225). The substring "n" is mapped to "street postdirection" address component (227). The substring "20" is mapped to "unit number" address component (231). Following the classification, the address verifier 131 checks the values of substrings mapped to address components and verifies that they conform to standardized formats for the respective address components in accordance with address format requirements of the jurisdiction. In this example, the values are correctly formatted and therefore, no changes or correction to format is required.

The address substrings mapped to address components are then provided as input to the address normalizer 141 to generate a normalized address substring values according to address suffix abbreviation rules. The normalized values of address substrings are presented in the "normalized parsed" block 251. The normalized values for "primary number" (261), "street name" (263), and "unit number" (271) address components are not changed by the normalizer. However, the "street suffix" address substring's value is changed to "Avenue" (265) from "Av" in the parsed block 211 above. Similarly, the "street postdirection" address substring's value is changed from "n" to "North" (267) in the normalized block 251. The value of "unit type" address component's value is changed from "unit" to "Unit" (269) in the normalized block 251. The address normalizer can use key-value dictionaries per address component per jurisdiction to normalize the values of address sub strings.

Finally, the templated standardized building address "6305 6th Avenue North" is output by the address constructor 151 as a concatenation of conformed address substrings. The templated standardized full address is output as "6305 6th Avenue North, Unit 20", which includes the unit number address substring. The address constructor can use per jurisdiction templates when constructing the standardized address which specify concatenation of the conformed address substrings according to specified order.

Remove Organization Name

FIG. 3 presents an example address string 301 that contains an organization's name "Horsham Athletic Club". The address parser 121 parses the input string and classifies substrings as address substrings and non-address substrings. The address substrings are mapped to the address components are shown in the "parsed" block 311. The isolator 125 identifies the non-address substring "Horsham Athletic Club" as not part of the address and maps it to "non-address" component 323 as shown in FIG. 3. The classifier 123 can include a trained NLP model that can classify substrings in the address string as non-address strings when the strings contain information for entities such as organization name in this example. Such entities may not be part of the standardized address for a given jurisdiction.

The normalizer 141 processes the values of address substrings output from the address verifier 125. The resulting normalized values are shown in the "normalized parsed" block 351. The value of "street suffix" address substring is normalized from abbreviation "Rd" (321) to "Road" (361). Finally, the "normalized building address" is output as "400 Horsham Road" which does not include the value of "not address" component 323. The "normalized full address" 391 is the same as the "normalized building address" above as there is no separate unit or apartment, etc. that is being referred to in the input address string 301.

Intersection Address

FIG. 4 presents an input address string 401 that describes location of an intersection. In many practical real-world situations, the location of a business or a POI is referred to with respect to an intersection. For example, the address of a coffee shop located besides an intersection may be referred to by the address string including description of the intersection such as: a coffee shop at the corner of 6th Ave & 13th Street.

The address parser 121 parses the address string "6th Ave & 13th Street" 401 and classifies address substrings. The classified substrings are then one-to-one mapped to address components as shown in the "parsed" block 411. The parser detects that the input address string 401 represents an intersection because of the presence of a substring containing a symbol "&" (425) in the address string. Therefore, the address string corresponds to intersection of two streets in the "parsed" block. The rules, such as the one described above which indicate the presence of an intersection address when two street address are present in the address string and the two street addresses are separated by a token, can be stored in the address translation rules database 118. The first address component "street name" is assigned a value of "6th" (421) and the second address component is assigned a value of "Ave" (423). The first and the second address components correspond to the first street in the intersection. The third address component is "intersection" and is assigned a value "&" (425). The fourth address component is "street name2" and is assigned a value of "13th" (427) and the fifth address component is "street suffix2" which is assigned a value of "Street" (429). The fourth and fifth address components correspond to the second street in the intersection address described by the input address string 401.

The address normalizer 141 normalizes the values of the address substrings in "parsed" block 411 and produces normalized values as shown in "normalized parsed" block 451. The normalizer 141 normalizes the "street suffix" value as "Avenue" (461) and "intersection" value as "And" (463). Finally, the templated standardized address is output as "Corner of 6th Avenue And 13th Street" (481). The standardized full address is the same as above (491). This example shows that the technology disclosed can process address strings with non-compliant signature corresponding to location of an intersection. Existing address translation systems may not process such address strings as they do not include the logic to detect intersections. Therefore, the technology disclosed can be applied in many practical situations where businesses or other places-of-interest are located in proximity to an intersection.

Remove Extra Number in Address

Figure 5:
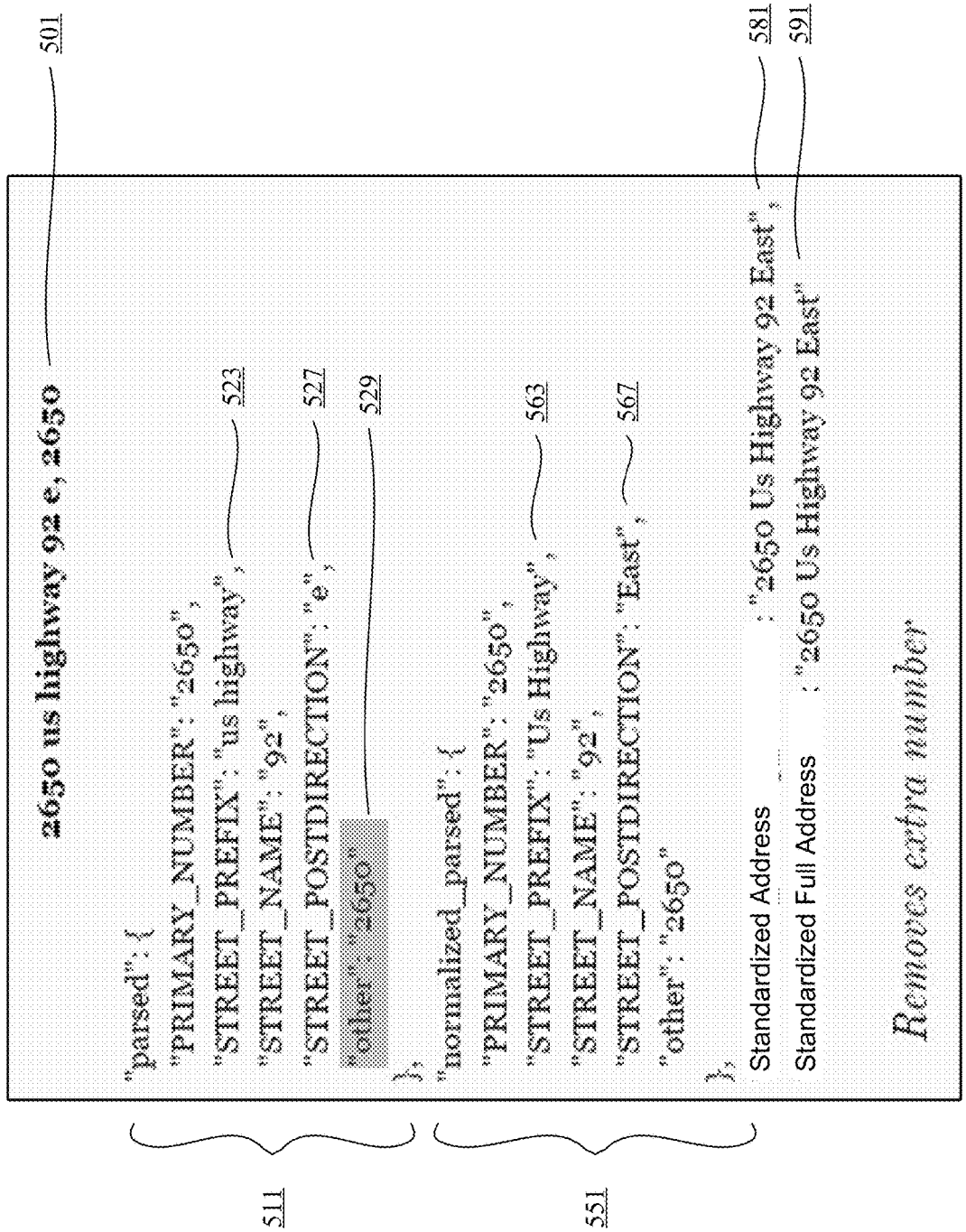
FIG. 5 presents an example of detecting a duplicate or redundant number in the address string and removing the duplicate number.

FIG. 5 presents an example of an address string in which includes an extra number or a duplicate number. The extra or duplicate number can be a primary number or a random number. The system can detect such non-compliant signature in the address string. The duplication can occur for any entity in the address string. Additionally, the duplicate substrings can be positioned adjacent to each other in the address string, or they can be positioned at random positions in the address string and may not be adjacent to each other. The duplicate detection rule such as the one described above can be stored in the address translation rules database 118.

The input address string 501 includes a substring "2650" at the beginning and at the end of the address string which are duplicate values of the primary number entity. The address parser parses the input address string 501 and classifies the substrings as address substrings and non-address substrings. The address substrings are mapped to respective address components as shown in the "parsed" block 511. The street prefix address component is assigned a value "us highway" (523) and "street postdirection" address component is assigned a value of "e" (527). The duplicate substring "2650" is assigned to "other" component indicating it is not part of the standardized address. The extra or duplicate primary number "2650" assigned to "other" address component 529 and may not be included in the standardized address.

The address normalizer 141 normalizes the values of address substrings in the "parsed" block 511. The normalized values of address substrings are shown in the "normalized parsed" block 551. The "street prefix" address substring's normalized value is "US Highway" 563 and the "street postdirection" address substring's normalized value is "East" 567. The templated standardized address is "2650 US Highway 92 East" which is constructed by concatenating the values of address substrings in the "normalized parsed" block 551 in the specified order. Note that the duplicate or extra number which is assigned to "other" address component 529 is not included in the standardized address. The standardized full address 591 is the same as the standardized address 581.

Remove Unnecessary Building Name

FIG. 6 presents an example of address string 601 that contains a building name which is unnecessary and is therefore not required in the standardized address. The address parser 121 parses the input address string 501 and classifies the substrings as address substrings and non-address substrings. The values of address substrings are mapped to address components as shown in the "parsed" block 611. The building name "Large Building" address substring is assigned to "building name" address component 627. Thus, the technology disclosed correctly detects the building name attribute in the input address string using the trained NLP model. This information, although not required in the templated standardized address but can be useful in some situations. Therefore, the system can include the value of building name address component in a full address output which may be useful for some users.

The address normalizer 141 normalizes the values of address substrings in the "parsed" block 611. The normalized values of address substrings are shown in the "normalized parsed" block 651. The "street suffix" address component is now assigned the normalized value "Street" (665). Similarly, the "unit type" address component is assigned the normalized value "Suite" (669). The values of other address components remain the same including the "building name" address component (667). The standardized building address is constructed by combining the normalized values of address substrings. The standardized building address "133 Terra Mango Street" does not include the value of building name address component (681). The standardized full address "133 Terra Mango Street, Large Building, Suite 100" (691) includes the values of building name, unit type and unit number address components.

Extract Sub-Entities or Address Sub-Components

Figure 7:
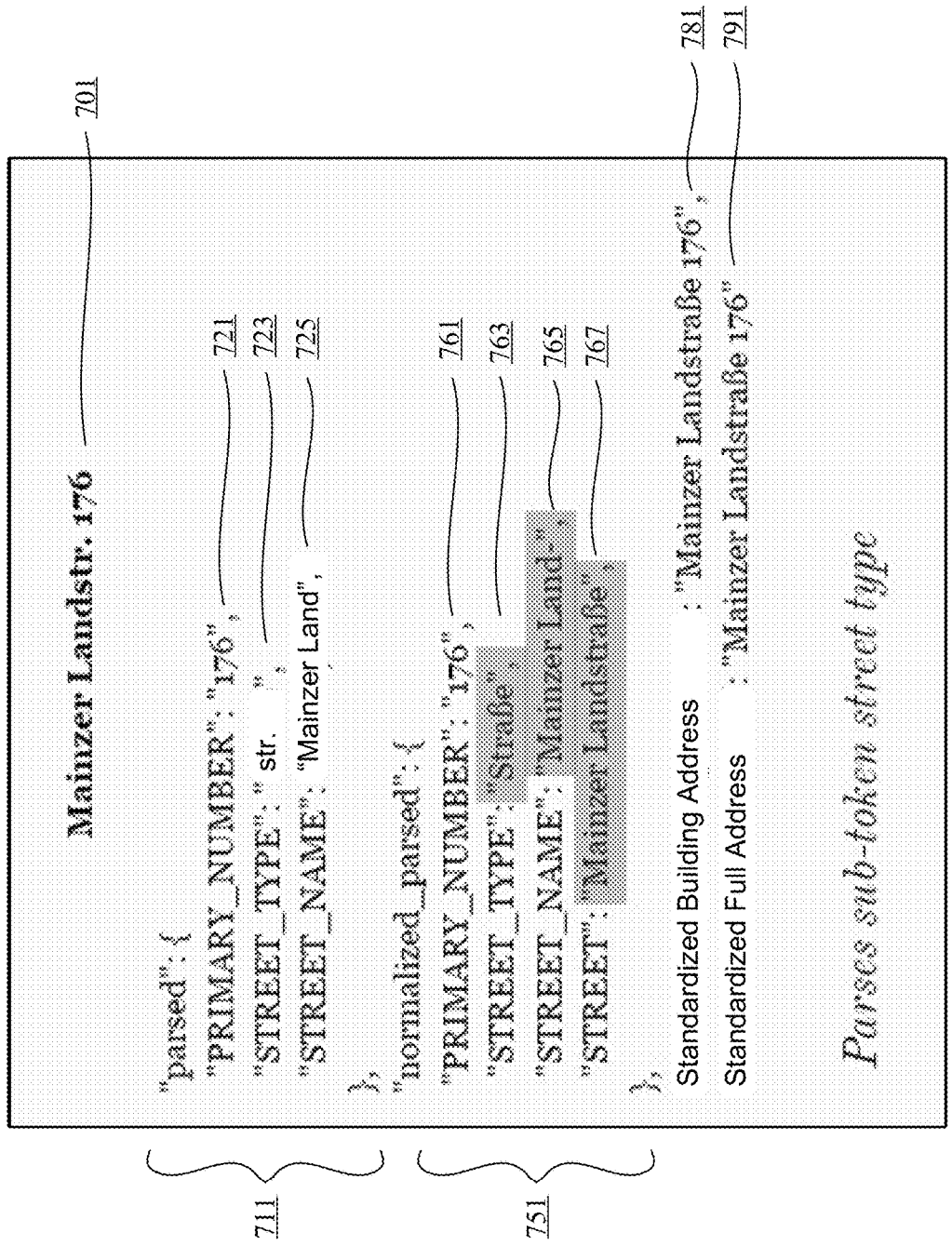
FIG. 7 presents an example address string comprising a substring with one-to-many mapping to address components and further partitioning the one-to-many mapped address substring.

FIG. 7 presents an example of an input address string that contains an address substring that maps to more than one address components. We can refer to this substring as containing multiple sub-entities. The input address string "Mainzer Landstr. 176" describes an address in which the substring "Landstr." maps to of two address components i.e., "street type" and "street name" address components. The partitioner 127 detects that the substring "Landstr." is a compound substring containing two sub-entities. Therefore, it invokes the classifier 123 to perform a second pass of the classification step to further classify the partitioned substrings "Land" and "str". In the second pass, the classifier 123 classifies the one-to-many mapped substring to two one-to-one mapped substrings. The address translator then maps the partitioned address substrings to respective address components. The resulting values assigned to address components after the second pass of the parsing are presented in the "parsed" block 711. The "primary number" address component is assigned a value "176" (721). The "street type" address component is assigned a value "str." (723) which is extracted from the "Landstr." substring in the second pass of the parsing. The "street name" address component is assigned a value "Mainzer Land" (725). The "street name" address component contains a portion of the substring i.e., "Land" extracted from "Landstr." substring in the second pass of the parsing. Therefore, the technology disclosed can partition one-to-many mapped address substrings in a substring in the address string.

The normalizer 141 processes the values of address components in the "parsed" block 711 and outputs the normalized values in a "normalized parsed" block 751. The "primary number" address component's value remains the same "176" (761) as before normalization. The "street type" address component's value is normalized to "Straße" (763). The "street name" address component's value is normalized to "Mainzer Land-" (765). The technology disclosed includes logic to construct a "street" address component by combining the "street type" and "street name" address components. The value of "street" address component is "Mainzer Landstraße" (767) as shown in "normalized parsed block" 751. Such address component construction rules can be stored per jurisdiction in the address translation rules database 118. The address string presented in this example is for a POI in Germany and therefore, the technology disclosed applies jurisdiction address construction rules specific to Germany to construct the normalized values for address components.

Finally, the address constructor 151 generates the templated standardized building address by combining the normalized address component values "Mainzer Lanstraße 176" (781). The standardized full address 791 is the same as the standardized building address 781.

Highway Addresses

Figure 8:
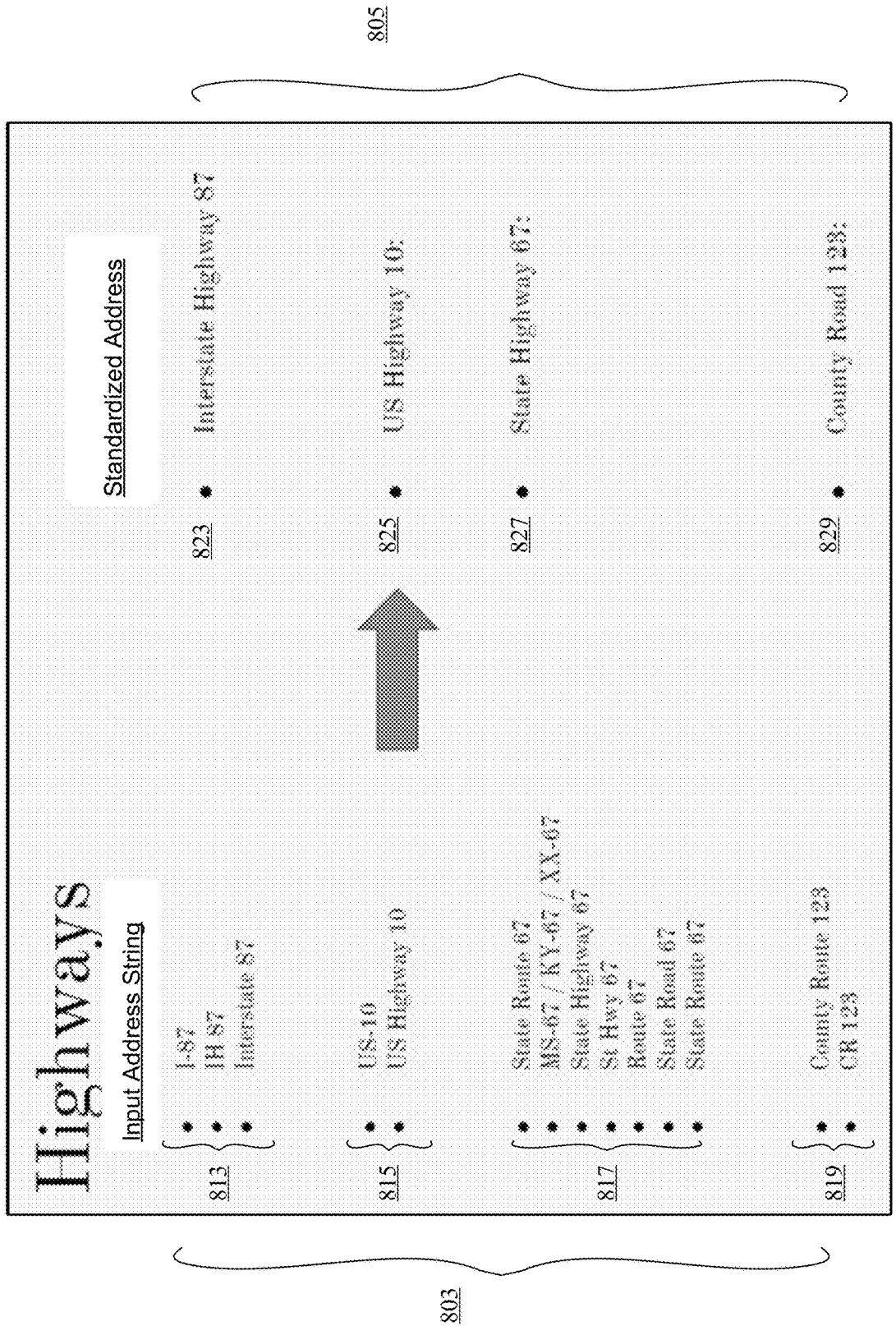
FIG. 8 presents various examples of address strings representing plurality of inconsistent highway addresses and corresponding standardized addresses translated by the universal address translator of FIG. 1.

FIG. 8 illustrates examples of United States highway addresses that are represented in a variety of ways with many non-compliant signatures as shown in the left-column 803 of FIG. 8. The standardized address generated by the technology disclosed are shown in the right-column 805 in FIG. 8. This example shows that the technology disclosed generates consistent standardized address for the same location even when many different variations of input address strings are provided as input. The system can take as input, multiple variations of a same highway address and construct a consistent standardized address. The first example 813 includes three different address strings for a same interstate highway, i.e., "1-87", "IH 87", and "Interstate 87". The output for all three variations of the input address strings is the same, i.e., "Interstate Highway 87" (823). The system follows the same processing steps as described above in description of examples presented in FIGS. 2 to 7 to generate consistent standardized addresses. There are two different input address strings "US-10" and "US Highway 10" (815) that are translated to the same standardized address "US Highway 10" (825). Seven different address strings "State Route 67", "MS-67/KY-67/XX-67", "State Highway 67", "St Hwy 67", "Route 67", "State Road 67", "State Route 67" (817) are translated to the same standardized address "State Highway 67" (827). Finally, the last example includes two address strings "County Route 123", and "CR 123" (819) that are translated to the same standardized address "County Road 123" (829) by the technology disclosed.

Ordinal/Cardinal/Spelled Out Street Number

Address strings can sometimes contain different formats for street numbers. This can result in inconsistent translated addresses by existing systems. For example, the "street name" following input address strings can be inconsistently translated by existing systems:

a. "506 e 1$^{st}$, bell, mo" is translated to (First), (St)
b. "113 1$^{st}$, pennock, mn" is translated to (1), (St)
c. "218 1$^{st}$, idaho falls, id" is translated to (1st), (St)

We can observe that "street name" entity is inconsistently translated across the three addresses listed above, in the address sting "a" the street name is "First", in the address string "b" the street name is "1", and in the address string "c" the street name is "1st". The technology disclosed includes logic to translate addresses consistently and deterministically using a standardized street number format.

FIG. 9 presents examples of composite street types that are often incorrectly represented in address strings. The composite street types include addresses that have more than one street type in the address string. The block 915 presents example of five addresses with composite street types, e.g., "Park Dr", Pwy Ave", "HI Rd", "St Ct", "Ave Ct". The corresponding standardized addresses with composite street types are also shown in the block 915. However, such composite street types are often incorrectly represented in intersection addresses. Block 920 presents two examples of intersection addresses that do not correctly illustrate that the location being referred to by the address is an intersection. The technology disclosed can correctly detect composite street types when they represent an intersection as explained with reference to example in FIG. 4.

Address Translation Process

Figure 10:
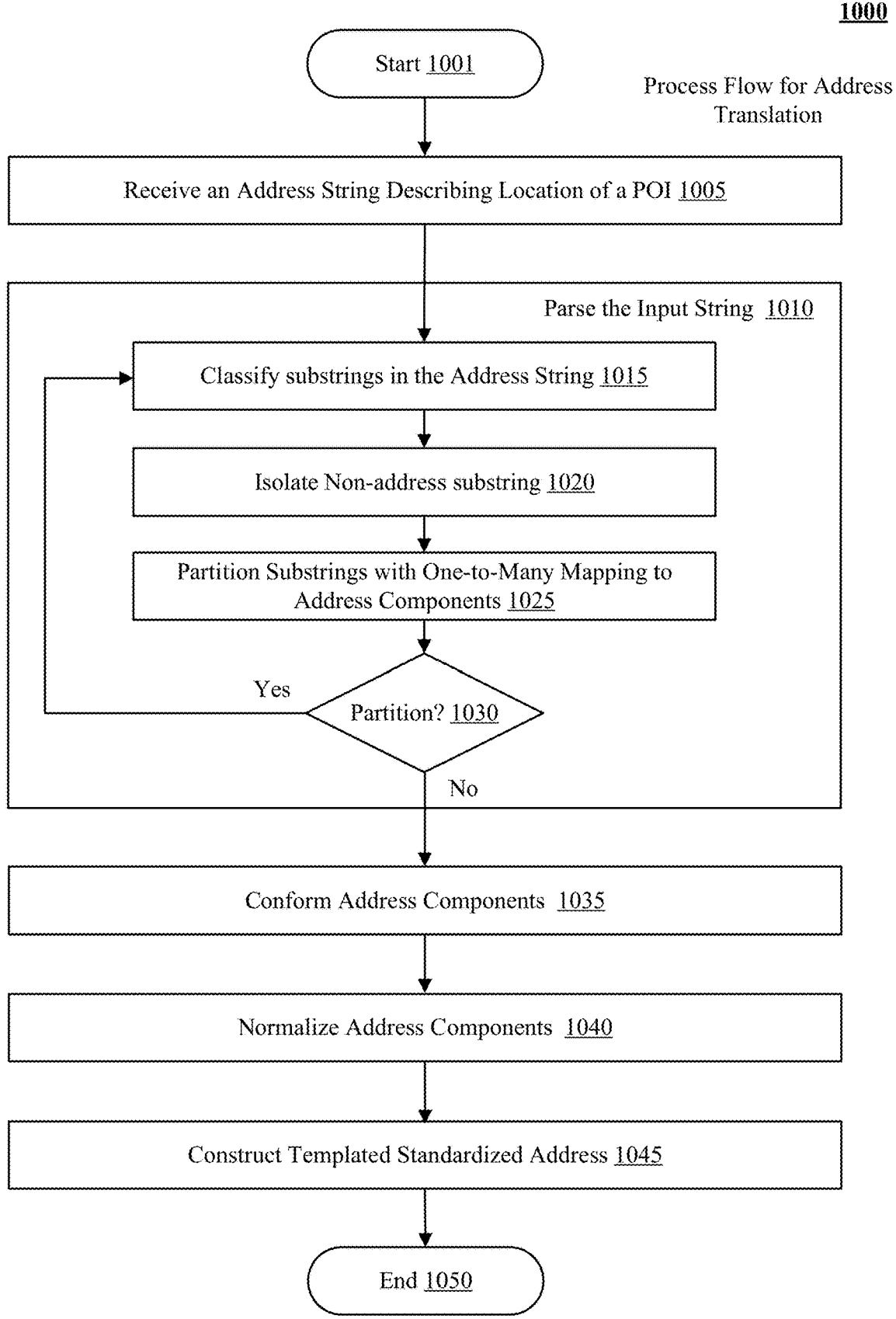
FIG. 10 presents a process flowchart for translating address strings to standardized addresses.

FIG. 10 presents a flowchart or flow diagram 1000 illustrating process steps for translating an address string into a standardized address. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flowchart herein shows only steps that are pertinent to an understanding of the technology disclosed, and it will be understood that numerous additional steps for accomplishing other functions can be performed before, after and between those shown.

The process starts at a step 1001. The system includes logic to receive an address string (or input string) comprising substring. The address string describes location of a POI (step 1005). The system can receive address strings from the text strings database 115 or directly from an end user.

The address string is parsed in a step 1010. The parsing step 1010 can comprise multiple process steps that are shown inside the box representing the parsing process step 1010 in the flowchart 1000. We describe the details of the steps illustrated inside the parsing step 1010 box. At a process step 1015, the system classifies the substrings of the address string as address substrings and non-address substrings. The substrings can be classified by a trained NLP model that can detect entities in the substrings and classify the substrings accordingly. A separate NLP model can be trained per jurisdiction. In one implementation, the classifier 123 includes the logic to perform the process step 1015. At a step 1020, the system isolates non-address substrings. The non-address substrings may not be included in the templated standardized address. The system can one-to-one map respective address substrings in the address string to respective address components. Some of the substrings in the address string may map to multiple address components. For example, address substrings can map to two or more address components. The system detects a substring with one-to-many mapping at a step 1025 and further partition the one-to-many mapped address substring into address substrings that one-to-one map to respective address components. The system invokes the classifier 123 at a step 1015 to partition one-to-many mapped address substring into address substrings that correspond to respective address components. The process then repeats the steps 1015, 1020 and 1025 until no more one-to-many mapped address substrings are detected (1030). The address substrings are then mapped to corresponding address components. Examples of address components for an address in the United States can include a primary number, a street name, a street suffix, a street postdirection, a unit type, a unit number, a city, a state, a country, a postal code etc. The non-address substrings can be mapped to non-address components. The non-address components can be stored separately and presented to the end user separate from the standardized address.

The system can access respective standardized formats for the respective address components which can be jurisdiction-specific (step 1035). The system can then conform the address substrings to the respective standardized formats of the respective address components to which the address substrings are mapped. Some address components such as Zip codes, postal codes, etc. have jurisdiction specific formats. The address verifier component 131 shown in FIG. 1 can conform the address substrings to respective standardized formats for respective address components to which the address substrings are mapped.

The system can normalize the values of address substrings at a step 1040. In one implementation, the system can access respective key-value dictionaries for address components to normalizes the substrings mapped to these address components. In one implementation, the address normalizer 141 includes the logic to normalize the values of address components.

Finally, the normalized values of address components are combined in a templated standardized address (step 1045). The templates can be defined per jurisdiction to comply with standardized addresses of the jurisdiction. The system can use a template that specifies an order of concatenating the conformed address substrings and concatenate the conformed address substrings according to specified order. In one implementation, the address constructor 151 includes the logic to construct standardized address. The conformed address substrings concatenated in the specified order are made available for further use by other systems or end users. The process ends at a step 1050.

Training of Named Entity Recognition Model

Named entity recognition is a task of identifying named entities in text and is often used as a first step in information retrieval, question answering, topic modeling, etc. The technology disclosed includes training of a named entity recognition (NER) model to detect and classify substrings (that include entities) in the address string. In one implementation, the technology disclosed uses an existing NER platform called spaCY available at <<spacy.io>>. This platform provides a library for advanced Natural Language Processing (NLP) in Python. For different languages, the platform can perform tokenization, sentence boundary detection, named entity recognition, text classification, etc. It offers statistical models for a variety of languages. In one implementation, we used spaCY version 2.0 for named entity recognition. The classification results from NER model are then further processed using jurisdiction-specific rules to verify the address components.

Named entity recognition (NER) is the task of tagging proper nouns and other named entities in text. We use spaCY (version 2.0) which is a library for natural language processing. This library supports building of applications that process and understand large volumes of text. The spaCY NER framework can assign labels to contiguous spans of tokens. A named entity is a real-world object that is assigned a name, for example, a person, a city, a country, etc. spaCY can recognize various types of named entities in a document by asking the model for a prediction. The spaCY framework applies four process steps i.e., embed, encode, attend and predict. Each step can be implemented by a separate component in the library. We briefly describe these processing steps in the following text.

In the embed step, the model attempts to learn a meaning of a word by processing surrounding words. For example, a "dog" in a sentence is usually around words like, "furry", "barks", "walked", "pet", etc. This step uses "doc2Array" procedure where four attributes of each token in the document are extracted, i.e., "norm", "prefix", "suffix", and "shape". Norm is a lowercase form of the token, in one example implementation, the prefix and suffix are of length three in spaCY by default. A word shape describes a high-level or zoomed out shape of the word. For example, to generate a word shape, all digits can be respectively replaced with letter "d", all lowercase alphabets can be respectively replaced with a lowercase "w" and all uppercase letters can be respectively replaced with an uppercase "W". The model can learn new words by looking at the shape of a word. The embed step results in a matrix with four columns per word in the document. In the embedding step, a separate embedding is generated for each of the four features of a word and concatenated. This output is then fed to a multilayer perceptron (MLP).

In the encode step, the context-independent vectors are encoded into context-sensitive sentence matrix. spaCY uses a convolutional neural network (CNN) for this purpose. The purpose of the CNN is to extract a window of words or phrases on either side of the word. The building block of the CNN model is a trigram CNN layer which takes a window on either side of the word, concatenates them together so that if we start with 128 dimensions per word, we will have 384 (128×3) dimensions for each word with redundancy on each side. This is provided as input to MLP to produce a 128-dimensional output. The model mixes information from words on either side of the target word so that the output word is of the same dimensionality (i.e., 128). After passing through the first layer, the model produces a vector which is sensitive to one word on either side of the target word. In the next layer, the next word to the one neighboring word on each side is used which means that the model now looks at two words on either side of the target word. Similarly, at the next layer the model is drawing information from four words on either side of the target information. The model also uses residual connections meaning that output of each convolutional layer is the sum of the output and the input. This means that output space of the convolutional layer is the same as the input to the convolutional layer. Therefore, the meanings of the words in the input are not moved around.

In the attend step, the model uses attention mechanism which takes a query vector as input. One vector per word in the sentence is provided as input and the model learns a weighted summary of that input.

In the predict step, which is the final processing step, the model passes the input word through a prediction layer which outputs class identifiers. A high-level architecture of spaCY library is available at <<spacy.io/api#nn-model>>.

In one implementation, three different models for three separate jurisdictions are trained based on the spaCY framework. Thus, one model per jurisdiction is trained, respectively. The three jurisdictions include the United States and Canada, the United Kingdom (UK) and Germany.

The first model is trained for addresses in the United States and Canada. We used a training data of 100K USA addresses. The training data is taken from "USAddress" library available at <<usaddress.readthedocs.io/en/latest/>>. In addition, labeled address data for the United States from an internal database (also referred to as MAPS database) is used to train the model. Inconsistent addresses were hand-labeled.

The second model is trained for addresses in the UK. We used a third-party service available at <<SmartyStreets.com>> to parse Ordnance Survey data available at <<www.ordnancesurvey.co.uk/>> and included hand-labeled examples as well.

The third model is trained for addresses in Germany. We used Libpostal library to generate training data using OpenStreetMap™ available at <<www.openstreetmap.org>> to train the model.

We evaluated the performance of the models at the entity-level (whether the entity is determined correctly or not) and the example-level (whether the address is translated correctly or not). The example-based performance score is lower than the entity-based performance score. The entity-based performance score may be better for some entities as compared to other entities. The scores are high for the first model as compared to the other two models. Tag-based or entity-based performance score (or f-score) is 99.905% and the example-based performance score (or f-score) is 99.7% for the best model. The model processes about 6K to 7K examples per second.

Particular Implementations

We describe various implementations of using a trained model to output address component classifications of a plurality of substrings in an input string.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to implement a trained model. The trained model is configured to process an input comprising a string that includes a sequence of substrings. The trained model produces, as output, respective address component classifications for respective substrings in the sequence of substrings. The trained model is trained on thousands to millions of training examples that map substrings to a plurality of address component types and a plurality of non-address component types.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The input string can include a first set of substrings. The string is processed by the trained model to generate address component classifications for each substring in the first set of substrings. At least one of the substrings in the first set of substrings is classified to two or more address components.

The address components can include a primary number address component, a street name address component, a street suffix address component, a street postdirection address component, a unit type address component, a unit number address component, a city address component, a state address component, a country address component, and a postal code address component.

In one implementation, the system is configured to access respective standardized formats for the address components. The system is configured to conform the substrings to respective standardized formats of address components to which the substrings are mapped.

In one implementation, the system is configured to use a template that specifies an order of concatenating the conformed substrings, and concatenate the conformed substrings according to specified order. The system is configured to make the conformed substrings concatenated in the specified order available for further use.

In one implementation, the system is configured to, prior to using the template, normalize the conformed substrings according to address suffix abbreviation rules.

The model can be trained using ground truth address strings for a particular jurisdiction in a plurality of jurisdictions.

Each of the features discussed in this particular implementation section for the system implementation apply equally to all other system implementation, except where incompatible. As indicated above, all the system features are not repeated in subsequent systems and should be considered repeated by reference.

Other implementations may include a non-transitory computer readable storage medium storing instructions executable by a processor to perform functions of the system described above. Yet another implementation may include a method performing the functions of the system described above.

Computer readable media (CRM) implementations of the technology disclosed include a non-transitory computer readable storage medium impressed with computer program instructions, when executed on a processor, perform functions of the system described above.

Each of the features discussed in this particular implementation section for the system implementation apply equally to the CRM implementation. As indicated above, all the system features are not repeated here and should be considered repeated by reference.

A method implementation of the technology disclosed includes processing through a trained model, as input, a string that includes a sequence of substrings. The method includes producing from the trained model, as output, respective component classifications for respective substrings in the sequence of substrings. The trained model is trained on thousands to millions of training examples that map substrings to a plurality of address component types and a plurality of non-address component types.

Each of the features discussed in this particular implementation section for the system implementation apply equally to this method implementation, except where incompatible. As indicated above, all the system features are not repeated for the method above and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

Clauses

A technology is described for processing an address string for a place-of-interest. The address string can include a plurality of substrings. The technology disclosed can construct a standardized address from the substrings in the input address string. The substrings can be classified as address substrings and non-address substrings. The technology disclosed can use per jurisdiction templates to construct the standardized address by using address substrings. The technology disclosed can map the address substrings to respective address components. The non-address substrings can be mapped to non-address components. The address substrings can be standardized using formatting rules for respective address components. The formatted substrings can be normalized using key-value dictionaries. The normalized address substrings can be ordered using per jurisdiction address templates to construct and output standardized addresses.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

We disclose the following clauses:

1. A computer-implemented method, including:
   receiving an address string for a place-of-interest, wherein the address string has a plurality of substrings;
   classifying sub strings in the plurality of sub strings as address sub strings and non-address substrings,
   one-to-one mapping respective address substrings in the address string to respective address components;
   one-to-many mapping at least one of the address substrings to two or more address components, and further partitioning a one-to-many mapped address substring into address substrings that correspond to respective address components;
   accessing respective standardized formats for the respective address components;
   conforming the address sub strings to the respective standardized formats of the respective address components to which the address substrings are mapped;
   using a template that specifies an order of concatenating the conformed address substrings, and concatenating the conformed address substrings according to specified order; and
   making the conformed address substrings concatenated in the specified order available for further use.

2. The method of clause 1, wherein the address components include a primary number address component, a street name address component, a street suffix address component, a street postdirection address component, a unit type address component, a unit number address component, a city address component, a state address component, a country address component, and a postal code address component.

3. The method of clause 1, wherein a model processes the address string as input and generates a substring-by-substring output that classifies each of the substrings as the address substrings and the non-address substrings.

4. The method of clause 1, wherein a model processes the address substrings as input and generates an output including one-to-one mapping of each of the substrings to respective address components.

5. The method of clause 1, further including:
   prior to using the template, normalizing the conformed address substrings according to address suffix abbreviation rules.

6. The method of clause 1, further including:
   prior to using the template, using positions of one-to-one mapped address substrings in the address string to detect a non-compliant address string;
   mapping the non-compliant string to a particular pre-defined non-compliant signature in a plurality of pre-defined non-compliant signatures; and
   applying a resolution specific to the particular pre-defined non-compliant signature to transform the non-compliant address string to a compliant address string.

7. The method of clause 6, wherein a pre-defined non-compliant signature in the plurality of pre-defined non-compliant signatures includes at least two address substrings positioned adjacent to each other in the address string and each address substring is one-to-one mapped to a street suffix address component.

8. The method of clause 6, wherein a pre-defined non-compliant signature in the plurality of pre-defined non-compliant signatures includes at least two address substrings positioned adjacent to each other in the address string and each address substring is one-to-one mapped to a same address component.

9. The method of clause 6, wherein a pre-defined non-compliant signature in the plurality of pre-defined non-compliant signatures includes at least two address substrings at random positions in the address string and each address substring is one-to-one mapped to a same address component.

10. The method of clause 6, wherein a pre-defined non-compliant signature in the plurality of pre-defined non-compliant signatures includes at least two address substrings in the address string separated by a separator token indicating an intersection location.

11. The method of clause 10, wherein the separator token can include at least one of an '&' symbol or an 'and' substring.

12. The method of clause 10, wherein at least one address substring in the at least two address substrings comprises at least two address substrings positioned adjacent to each other wherein a first address substring is one-to-one mapped to a street name address component and a second address substring is one-to-one mapped to a street suffix address component.

13. The method of clause 1, further including one-to-one mapping at least one address substring to a redundant address component and not concatenating the address substring one-to-one mapped to the redundant address component when using the template that specifies the order of concatenating the conformed address substrings.

14. The method of clause 1, further including:
receiving a second address string for the place-of-interest, wherein the second address string has a plurality of substrings;
applying the classifying, the one-to-one mapping, the one-to-many mapping, the accessing, the conforming, the using the template steps to the second address string, wherein the order of concatenating the conformed address substrings for the second address string matches the order of concatenating the conformed address substrings for the address string for the place-of-interest.

15. The method of clause 1, wherein the template that specifies the order of concatenating the conformed address substrings uses coding accuracy support system (or CASS) address format.

16. The method of clause 3, wherein the model is trained using ground truth address strings for a particular jurisdiction in a plurality of jurisdictions.

17. The method of clause 16, wherein the address string for the particular jurisdiction is provided as input to the trained model to classify substrings in the address string.

18. The method of clause 1, wherein the standardized formats for address components are accessed based on a per-jurisdiction basis.

19. The method of clause 1, wherein the template that specifies an order of concatenating the conformed address substrings is used on a per-jurisdiction basis.

20. A system including one or more processors coupled to memory, the memory loaded with computer instructions, the instructions, when executed on the processors, implement actions comprising:
receiving an address string for a place-of-interest, wherein the address string has a plurality of substrings;
classifying substrings in the plurality of substrings as address substrings and non-address substrings, one-to-one mapping respective address substrings in the address string to respective address components;
one-to-many mapping at least one of the address substrings to two or more address components, and further partitioning a one-to-many mapped address substring into address substrings that correspond to respective address components;
accessing respective standardized formats for the respective address components;
conforming the address substrings to the respective standardized formats of the respective address components to which the address substrings are mapped;
using a template that specifies an order of concatenating the conformed address substrings, and concatenating the conformed address substrings according to specified order; and
making the conformed address substrings concatenated in the specified order available for further use.

21. The system of clause 20, wherein the address components include a primary number address component, a street name address component, a street suffix address component, a street postdirection address component, a unit type address component, a unit number address component, a city address component, a state address component, a country address component, and a postal code address component.

22. The system of clause 20, wherein a model processes the address string as input and generates a substring-by-substring output that classifies each of the substrings as the address substrings and the non-address substrings.

23. The system of clause 20, further implementing actions comprising:
prior to using the template, using positions of one-to-one mapped address substrings in the address string to detect a non-compliant address string;
mapping the non-compliant string to a particular pre-defined non-compliant signature in a plurality of pre-defined non-compliant signatures; and
applying a resolution specific to the particular pre-defined non-compliant signature to transform the non-compliant address string to a compliant address string.

24. A non-transitory computer readable storage medium impressed with computer program instructions, the instructions, when executed on a processor, implement a method comprising:
receiving an address string for a place-of-interest, wherein the address string has a plurality of substrings;
classifying sub strings in the plurality of sub strings as address sub strings and non-address substrings,
one-to-one mapping respective address substrings in the address string to respective address components;
one-to-many mapping at least one of the address substrings to two or more address components, and further partitioning a one-to-many mapped address substring into address substrings that correspond to respective address components;
accessing respective standardized formats for the respective address components;
conforming the address substrings to the respective standardized formats of the respective address components to which the address substrings are mapped;
using a template that specifies an order of concatenating the conformed address substrings, and concatenating the conformed address substrings according to specified order; and
making the conformed address substrings concatenated in the specified order available for further use.

25. The non-transitory computer readable storage medium of clause 24, implementing the method further comprising:
prior to using the template, using positions of one-to-one mapped address substrings in the address string to detect a non-compliant address string;
mapping the non-compliant string to a particular pre-defined non-compliant signature in a plurality of pre-defined non-compliant signatures; and
applying a resolution specific to the particular pre-defined non-compliant signature to transform the non-compliant address string to a compliant address string.

Computer System

Figure 11:
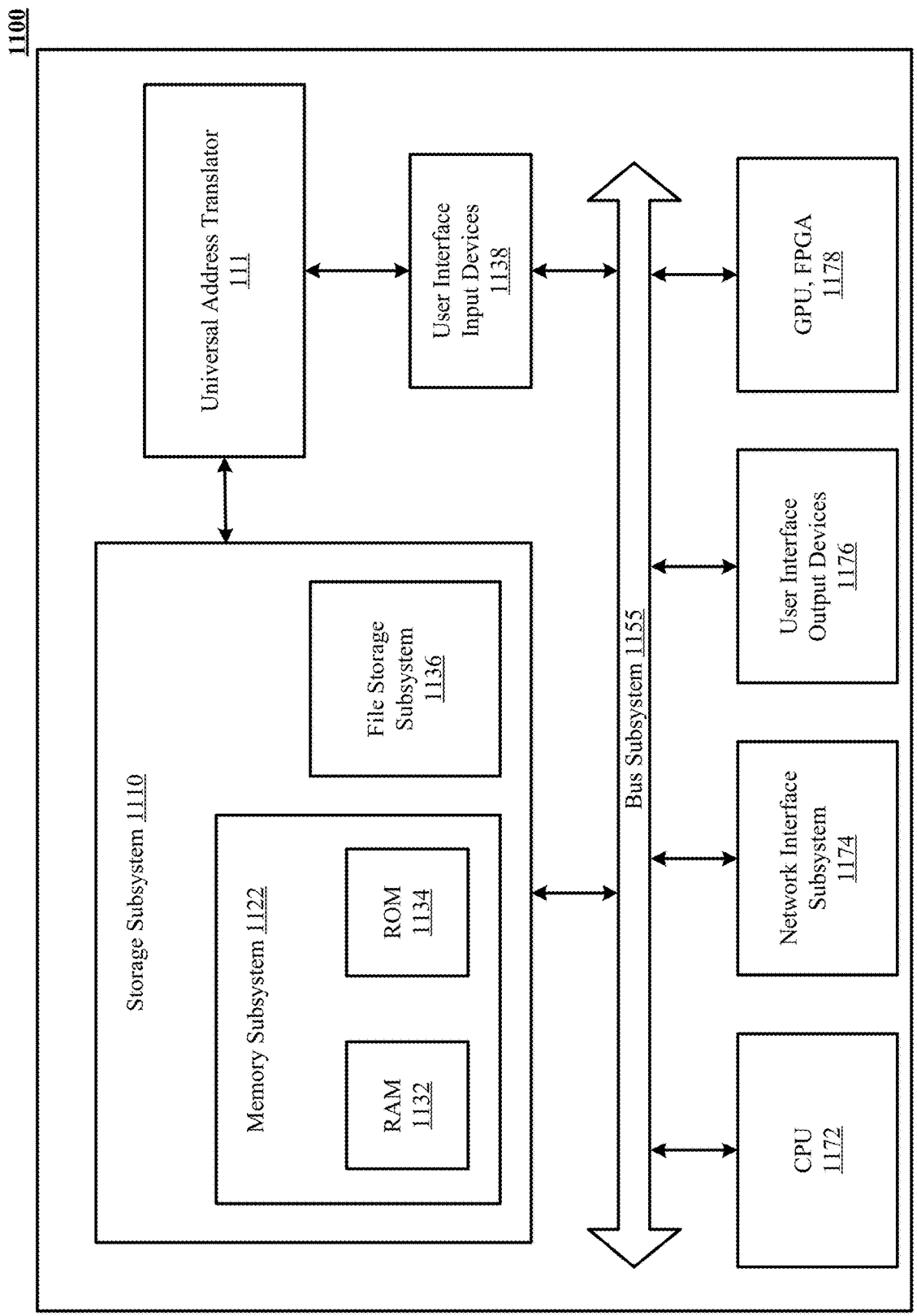
FIG. 11 presents an example computer system implementing the system of FIG. 1.

FIG. 11 is a simplified block diagram of a computer system 1100 that can be used to implement the universal address translator 111 of FIG. 1. Computer system 1100 includes at least one central processing unit (CPU) 1172 that communicates with a number of peripheral devices via bus subsystem 1155. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one implementation, the universal address translator 111 of FIG. 1 is communicably linked to the storage subsystem 1110 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. Subsystem 1178 can be graphics processing units (GPUs) or field-programmable gate arrays (FPGAs).

Memory subsystem 1122 used in the storage subsystem 1110 can include a number of memories including a main random access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or less components than the computer system depicted in FIG. 11.

I claim as follows:

1. A system, comprising:
   one or more processors; and
   one or more non-transitory computer readable media to store instructions executable by the one or more processors to perform operations comprising:
      parsing, using an address parser, a string comprising a set of substrings;
      classifying, by a machine learning model comprising a named entity recognition model, the set of substrings into:
         a set of address substrings; and
         a set of non-address substrings;
      mapping a non-address substring from the set of non-address substrings to a non-address component, wherein the non-address substring is excluded from a standardized address based on a jurisdiction-specific template; and
      producing, as output, an address component classification for individual substrings in the set of substrings;
      wherein the machine learning model further comprises a convolutional neural network configured to encode context-independent vectors into a context-sensitive sentence matrix starting with at least a 128 dimensions for individual words in the set of substrings.

2. The system of claim 1, wherein the operations further comprise:
   generating an address component classification for each substring in the first set of substrings;
   classifying, by the classifier, at least one of the substrings in the set of substrings to two or more address components; and
   partitioning individual address substrings in the set of address substrings to create a one-to-one mapping of address substrings to address components.

3. The system of claim 2, wherein the operations further comprise:
   detecting that a particular address substring of the one or more address substrings is:
      not a street name; and
      not a street suffix;
   determining that the particular address substring includes the street name and the street suffix; and
   parsing, by the classifier, the particular address substring a second time to classify and partition a one-to-many substring into two or more one-to-one substrings.

4. The system of claim 1, wherein the set of address substrings include a primary number address component, a street name address component, a street suffix address component, a street postdirection address component, a unit type address component, a unit number address component, a city address component, a state address component, a country address component, and a postal code address component.

5. The system of claim 1, wherein the operations further comprise:
   accessing respective standardized formats for the individual address substrings in the set of address substrings; and
   conforming the individual address substrings to the respective standardized formats to which the substrings are mapped.

6. The system of claim 5, wherein the operations further comprise:
   selecting, from a plurality of templates, a template associated with a particular jurisdiction that specifies an order of concatenating the conformed substrings;
   concatenating the conformed substrings according to the order specified in the template; and
   making the conformed substrings concatenated in the specified order available for further use.

7. The system of claim 6, the operations further comprising:
   prior to selecting the template, normalizing the conformed substrings according to a plurality of address suffix abbreviation rules.

8. The system of claim 1, wherein:
   the machine learning model learns a meaning of a word in a particular substring by processing surrounding words in the particular substring, resulting in a matrix with four columns per word that is provided as input to a multilayer perceptron.

9. A computer-implemented method, comprising:
   parsing, using an address parser, a string comprising a set of substrings;
   classifying, by a machine learning model comprising a named entity recognition model, the set of substrings into:
      a set of address substrings; and
      a set of non-address substrings;
   mapping a non-address substring from the set of non-address substrings to a non-address component, wherein the non-address substring is excluded from a standardized address based on a jurisdiction-specific template; and
   producing, as output, an address component classification for individual substrings in the set of substrings;
   wherein the machine learning model further comprises a convolutional neural network configured to encode context-independent vectors into a context-sensitive sentence matrix starting with at least a 128 dimensions for individual words in the set of substrings.

10. The computer-implemented method of claim 9, further comprising:
    generating an address component classification for each substring in the set of substrings;
    classifying, by the classifier, at least one of the substrings in the set of substrings to two or more address components; and
    partitioning individual address substrings in the set of address substrings to create a one-to-one mapping of address substrings to address components.

11. The computer-implemented method of claim 10, wherein at least one of the substrings in the set of substrings is classified to two or more address components.

12. The computer-implemented method of claim 9, wherein the set of address substrings include a primary number address component, a street name address component, a street suffix address component, a street postdirection address component, a unit type address component, a unit number address component, a city address component, a state address component, a country address component, and a postal code address component.

13. The computer-implemented method of claim 9, further comprising:
    accessing respective standardized formats for the individual address substrings in the set of address substrings; and
    conforming the individual address substrings to the respective standardized formats s to which the substrings are mapped.

14. The computer-implemented method of claim 13, further comprising:
    selecting, from a plurality of templates, a template that specifies an order of concatenating the conformed substrings;
    concatenating the conformed substrings according to the order specified in the template; and
    making the conformed substrings concatenated in the specified order available for further use.

15. The computer-implemented method of claim 14, further comprising:
    prior to selecting the template, normalizing the conformed substrings according to a plurality of address suffix abbreviation rules.

16. The computer-implemented method of claim 9, wherein;
    the machine learning model learns a meaning of a word in a particular substring by processing surrounding words in the particular substring, resulting in a matrix with four columns per word that is provided as input to a multilayer perceptron.

17. A non-transitory computer readable storage medium to store instructions that when executed by a processor to perform operations comprising:
    parsing, using an address parser, a string comprising a set of substrings;
    classifying, by a machine learning model comprising a named entity recognition model, the set of substrings into:
        a set of address substrings; and
        a set of non-address substrings;
    mapping a non-address substring from the set of non-address substrings to a non-address component, wherein the non-address substring is excluded from a standardized address based on a jurisdiction-specific template; and
    producing, as output, an address component classification for individual substrings in the set of substrings;
    wherein the machine learning model further comprises a convolutional neural network configured to encode context-independent vectors into a context-sensitive sentence matrix with at least a 128 dimensions for individual words in the set of substrings.

18. The non-transitory computer readable storage medium of claim 17, the operations further comprising:
    generating an address component classification for each substring in the set of substrings;
    classifying, by the classifier, at least one of the substrings in the set of substrings to two or more address components; and
    partitioning individual address substrings in the set of address substrings to create a one-to-one mapping of address substrings to address components.

19. The non-transitory computer readable storage medium of claim 18, wherein at least one of the substrings in the set of substrings is classified to two or more address components.

20. The non-transitory computer readable storage medium of claim 17, wherein the set of address substrings include a primary number address component, a street name address component, a street suffix address component, a street postdirection address component, a unit type address component, a unit number address component, a city address component, a state address component, a country address component, and a postal code address component.

21. The non-transitory computer readable storage medium of claim 17, the operations further comprising:
    accessing respective standardized formats for the individual address substrings in the set of address substrings; and
    conforming the individual address substrings to the respective standardized formats to which the substrings are mapped.

22. The non-transitory computer readable storage medium of claim 21, the operations further comprising:
    selecting, from a plurality of templates, a template that specifies an order of concatenating the conformed substrings;
    concatenating the conformed substrings according to the order specified in the template; and
    making the conformed substrings concatenated in the specified order available for further use.

23. The non-transitory computer readable storage medium of claim 22, the operations further comprising:
    prior to selecting the template, normalizing the conformed substrings according to a plurality of address suffix abbreviation rules.

24. The non-transitory computer readable storage medium of claim 17, wherein the machine learning model learns a meaning of a word in a particular substring by processing surrounding words in the particular substring, resulting in a matrix with four columns per word that is provided as input to a multilayer perceptron.

* * * * *